(12) United States Patent
Frost et al.

(10) Patent No.: US 8,275,317 B2
(45) Date of Patent: *Sep. 25, 2012

(54) RADIO CONTROLLER SYSTEM AND METHOD FOR REMOTE DEVICES

(75) Inventors: Harlie D. Frost, Austin, TX (US); William Reber, Rolling Meadows, IL (US)

(73) Assignee: Rejoice Holding, GP, Austin, TX (US)

( * ) Notice: Subject to any disclaimer, the term of this patent is extended or adjusted under 35 U.S.C. 154(b) by 65 days.

This patent is subject to a terminal disclaimer.

(21) Appl. No.: 12/767,336

(22) Filed: Apr. 26, 2010

(65) Prior Publication Data

US 2010/0267372 A1  Oct. 21, 2010

Related U.S. Application Data

(63) Continuation of application No. 11/970,180, filed on Jan. 7, 2008, now Pat. No. 7,734,254, which is a continuation of application No. 10/652,580, filed on Aug. 29, 2003, now abandoned.

(51) Int. Cl.
  *H04B 7/00* (2006.01)
  *H04K 3/00* (2006.01)
(52) U.S. Cl. ............... 455/41.2; 244/189; 348/211.99
(58) Field of Classification Search ........ 455/41.2–41.3, 455/418–420, 566; 244/189–190; 348/211.99, 348/211.2, 211.8, 211.11
See application file for complete search history.

(56) References Cited

U.S. PATENT DOCUMENTS

| | | | |
|---|---|---|---|
| 5,035,382 A | 7/1991 | Lissaman et al. | 244/190 |
| 6,473,114 B1 | 10/2002 | Strubbe | 348/14.07 |
| 6,658,325 B2 | 12/2003 | Zweig | 700/245 |
| 6,809,759 B1 | 10/2004 | Chiang | 348/211.2 |
| 2002/0066018 A1 | 5/2002 | Linnartz | 713/171 |
| 2002/0093531 A1 | 7/2002 | Barile | 345/753 |
| 2002/0154221 A1 | 10/2002 | Ishimaru | 348/207.1 |
| 2003/0054794 A1 | 3/2003 | Zhang | 455/403 |
| 2003/0081119 A1 | 5/2003 | Robinson et al. | 348/135 |
| 2003/0114106 A1 | 6/2003 | Miyatsu et al. | 455/41 |
| 2003/0195658 A1 | 10/2003 | Takano | 700/245 |
| 2004/0081110 A1 | 4/2004 | Koskimies | 370/315 |

FOREIGN PATENT DOCUMENTS

EP    1087355 A2    3/2001

*Primary Examiner* — Lee Nguyen
(74) *Attorney, Agent, or Firm* — Trop, Pruner & Hu, P.C.

(57) ABSTRACT

A system and method for remote device control are disclosed. A system incorporating teachings of the present disclosure may include a radio controlled toy and a controller for controlling the toy. In some embodiments, the controller may have an input mechanism and a housing component that defines a cavity, within which may be located a wireless wide area transceiver and a wireless local area transceiver. Some controllers may also have an operating system for the controller and an application resident on the controller and operable to convert inputs received via the input mechanism into commands for the toy. The controller may have a microprocessor operable to execute the application and to cause the commands to be communicated to the toy using the wireless local area transceiver.

14 Claims, 2 Drawing Sheets

RADIO CONTROLLER SYSTEM AND METHOD FOR REMOTE DEVICES

This application is a continuation of U.S. patent application Ser. No. 11/970,180, filed Jan. 7, 2008 entitled "A RADIO CONTROLLER SYSTEM AND METHOD FOR REMOTE DEVICES," now U.S. Pat. No. 7,734,254, issued Jun. 8, 2010 which is a continuation of U.S. patent application Ser. No. 10/652,580, filed Aug. 29, 2003 entitled "A RADIO CONTROLLER SYSTEM AND METHOD FOR REMOTE DEVICES," now abandoned, the content of which is hereby incorporated by reference.

TECHNICAL FIELD

The following disclosure relates to remote device controllers, and more particularly to a system and method for controlling remote devices with radio waves.

BACKGROUND

Generally speaking, a radio wave is an electromagnetic wave propagated by an antenna. Radio waves can have different frequencies. Tuning a receiver to a specific frequency allows the receiver to pick up or listen to the waves or signals propagated at that specific frequency.

In the United States, the Federal Communications Commission (the FCC) governs which frequencies may be used and for what purposes. In effect, the FCC has divided the radio frequencies into frequency bands or spectrums and issues licenses to entities desiring to use those frequency bands.

Common frequency bands include the following: AM radio—535 kilohertz (KHz) to 1.7 megahertz (MHz); Short wave radio—bands from 5.9 MHz to 26.1 MHz; Citizens band (CB) radio—26.96 MHz to 27.41 MHz; FM radio—88 MHz to 108 MHz; and Television stations—174 to 220 MHz for channels 7 through 13.

Though there are some unlicensed spectrums, many wireless devices have their own band. Garage door openers operate around 40 MHz. Baby monitors operate around 49 MHz. Many relatively simple radio controlled (RC) toys operate at either 27 MHz or 49 MHz, which represent frequencies allocated by the FCC for basic consumer items. Advanced RC models, such as the more sophisticated RC airplanes and RC cars may use 72-MHz or 75-MHz frequencies, respectively.

DETAILED DESCRIPTION

As mentioned above, radio waves may have different frequencies, and tuning a receiver to a specific frequency allows the receiver to pick up or listen to the waves or signals propagated at that specific frequency.

Many of the most common wireless devices available today have an assigned spectrum. Garage door openers operate around 40 MHz. Baby monitors operate around 49 MHz. And, many relatively simple radio controlled (RC) toys operate at either 27 MHz or 49 MHz, frequencies allocated by the FCC for basic consumer items. Advanced RC models, such as the more sophisticated RC airplanes and RC cars may use 72-MHz or 75-MHz frequencies, respectively.

In simple terms, radio controlled toys and devices may have four main parts: (1) a controller—the controller may be held in your hands to control the toy or device and sends radio waves or RF signals to the receiver; (2) a receiver—usually an antenna and circuit board associated with the toy or device that may receive the signals from the controller and activate motors or other controllable features as commanded by the controller; (3) a motor or actuator—the motor/actuator may turn wheels, steer the vehicle, operate propellers, etc.; and (4) power sources for the controller end of the system and for the toy and associated components.

Figure 1:
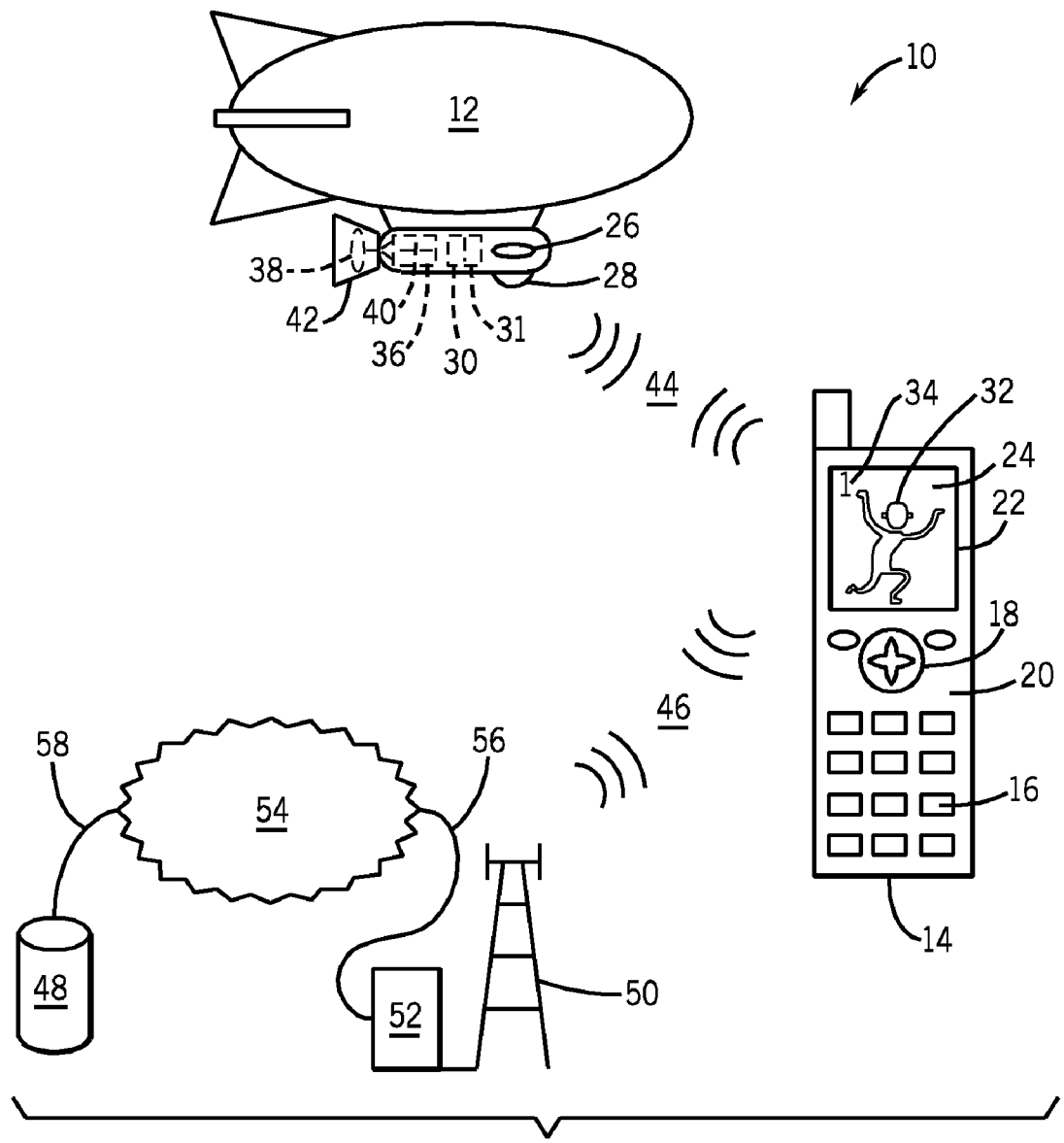
FIG. 1 illustrates a system incorporating teachings of the present disclosure for remotely controlling a toy blimp.

As explained above in the brief description of the figures, FIG. 1 illustrates a system 10 incorporating teachings of the present disclosure for remotely controlling a toy blimp 12. As depicted, system 10 includes among other things blimp 12 and controller 14, which may be embodied in a cellular telephone or other suitable device. For example, controller 14 may be implemented with several other types of computing devices like a laptop, a personal computer, a personal digital assistant (PDA), a smartphone, a wireless hub or gateway with sufficient computing power, etc.

As shown in FIG. 1, controller 14 has several input mechanisms including keypad 16 and toggle disk 18. Controller 14 may also include a microphone assembly operable to receive voice commands, a mouse, or a touch screen for receiving inputs from a stylus. In the embodiment of FIG. 1, keypad 16 and toggle disk 18 are located at an outer surface of controller 14. The outer surface of controller 14 and the cavity formed therein may be at least partially defined by one or more housing components like front panel 20.

Depending on the embodiment deployed, controller 14 may have any of several components located within its cavity. For example, controller 14 may have a wireless wide area transceiver, a wireless local area transceiver, a microprocessor, and a memory all located within the cavity. In some embodiments, the memory may hold an application that is operable to convert inputs received via any or all of controller 14's various input mechanisms into commands for blimp 12. The same or different application may also be operable to initiate communication of the commands using the wireless local area transceiver or the wireless wide area transceiver. In some embodiments, controller 14 may be capable of controlling several different RC toys or devices.

Though FIG. 1 depicts system 10 as including blimp 12 as the radio controllable toy, other toys and/or electronic devices and appliances may work within system 10. For example, other toys could include automobiles, airplanes, helicopters, boats, submarines, animals, robots, etc. Other devices could include kitchen and household appliances, consumer electronics equipment like stereos and televisions, vehicles, automobiles, or surveillance system components.

As mentioned above, controller 14 may include any of several different components. For example, controller 14 may have a wireless wide area transceiver, which may be part of a multi-device platform for communicating data using RF technology across a large geographic area. The platform may be a GPRS, EDGE, or 3GSM platform, for example, and may include multiple integrated circuit (IC) devices or a single IC device. Similarly, controller 14 may have a wireless local area transceiver, which may communicate using spread-spectrum radio waves in a 2.4 GHz range, 5 GHz range, or other suitable range. The wireless local area transceiver may also be part of a multi-device or single device platform and may facilitate communication of data using low-power RF technology across a smaller geographic area. For example, if the wireless local area transceiver includes a Bluetooth transceiver, the transceiver may have a communication range having approximately a one hundred foot radius. If the wireless local area transceiver includes an 802.11 transceiver, such as an 802.11(b) or Wi-Fi transceiver, the transceiver may have a communication range having approximately a one thousand foot radius. One skilled in the art will also recognize that the wireless local area transceiver and the wireless wide area transceiver may be separate or part of the same chipset. For example, controller 14's chipset may package Bluetooth, 802.11(b), and a GSM cellular technology, like GPRS, into a single chipset.

Figure 2:
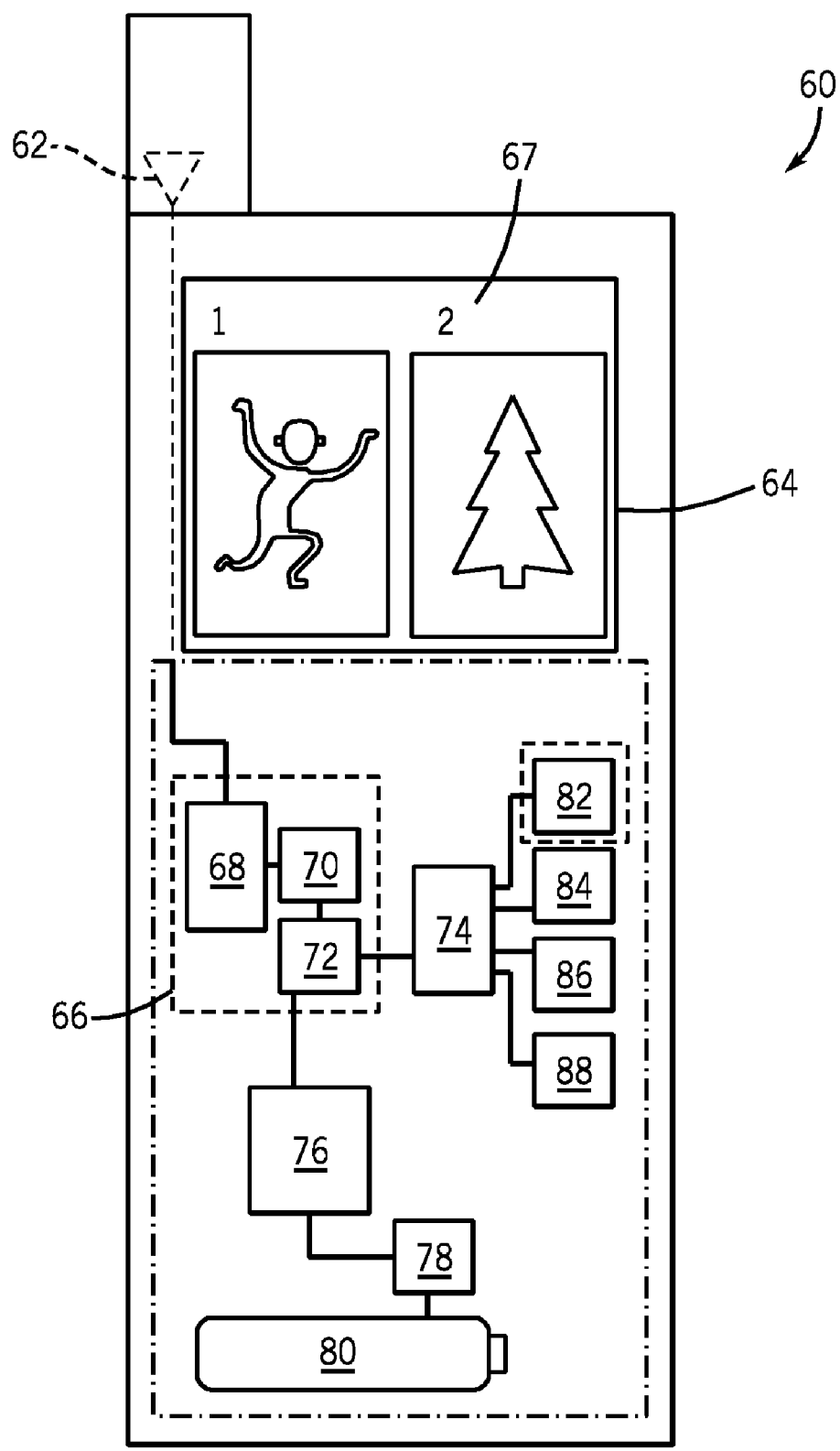
FIG. 2 depicts a cut away view of a cellular telephone incorporating teachings of the present disclosure in order to act as a remote control for electronic devices.

As depicted in FIG. 1, controller 14 may also include a display device 22, which may be operable to present a graphical user interface (GUI) 24 to a user. In some embodiments of system 10, blimp 12 may include an image-capturing device such as camera lens 26 and camera lens 28. As shown, camera lens 26 may have digital zoom capability and camera lens 28 may be a fisheye lens. Occasionally, a user of system 10 may desire to have the image data captured by blimp 12 communicated to controller 14. In such an embodiment, blimp 12 may include a transceiver 30 with an associated memory 31. Transceiver 30, which may have wide-area and/or local-area capabilities, may be operable to send data representing images captured by lens 26 and/or 28 to controller 14 for presentation within GUI 24 on display device 22. In an embodiment like system 10, where blimp 12 has at least two lenses, controller 14 may have a display manager that facilitates the presentation of the different images being captured by different lenses. The display manager may be a software application executing on controller 14. As shown in FIG. 1, GUI 24 depicts an image 32 and a camera indicator 34. Camera indicator 34 lets the user know that the image being displayed, image 32, is representative of the image being captured by a specific lens--in the depicted case, LENS 1. FIG. 2 depicts an embodiment in which two different images are being displayed simultaneously, though in separate display panes, on a controller display device.

During operation of system 10, controller 14 may receive an input from a user (not shown) that directs operation of a controllable feature of blimp 12. For example and in addition to transceiver 30, blimp 12 may have a motor 36 that drives propeller 38 and an actuator 40 for turning rudder 42. One skilled in the art will recognize that blimp 12 as well as other controllable devices may have more, less, or different controllable features.

In response to a received input, a component of controller 14 may initiate communication of data that represents the input to blimp 12. In some embodiments, the communication may occur over an infrared link. As shown in FIG. 1, the communication may occur over RF link 44, which may utilize a local area wireless technology. The communication may be received by transceiver 30 and converted into commands for motor 36 and/or actuator 40. Transceiver 30 may also send image data representing images captured by lens 26 back to controller 14 across RF link 44. As such, controller 14 may receive the image data and display an image, like image 32, which may be derived from the image data.

In some embodiments, controller 14 may save the image data so that it may be converted into an animated sequence by an animator application. In other embodiments, controller 14 may communicate the saved image data as an attachment to an electronic mail message. For example, if controller 14 is operable as a smartphone and capable of communicating voice calls and data calls, a user of controller 14 may elect to share the image data with a friend via a wide area cellular network using, for example, wide area RF link 46. The user may also elect to have one or both of RF link 44 and RF link 46 include encrypted communications.

In an embodiment where controller 14 is operable as a telephone, the telephone may be executing a local software application to allow the telephone to receive a user input and to convert the input into a command—allowing the phone to act as a controller. In such an embodiment, controller 14 may include a computer-readable medium having computer-readable data to direct a wireless telephone processor to interpret user inputs into data for controlling a radio controlled device, to initiate communication of the data, to recognize data received from the radio controlled device as image data, and to initiate presentation of a rendering of the image data on a display device like display 22.

Occasionally, a controller application may reside on controller 14 from the moment an original user acquires controller 14. As such, a user may power on controller 14, which may present the user with GUI 24 on display 22. The user may then be able to launch the controller application for controlling blimp 12 by selecting an icon presented on GUI 24. At which point, the user may be able to input commands into controller 14 for controlling blimp 12. For example, a user may pivot toggle disk 18 to "tell" blimp 12 to move one direction or another. A user may depress keys on keypad 16 to "tell" blimp 12 to accelerate or to send an image from lens 26.

In some cases, the application may be part of a file, which may not originally reside on controller 14. For example, a user may purchase a new electronic device, like blimp 12, a security system, a kitchen appliance, a television, etc. The user may want to control the device with a cellular telephone, but the telephone may not have an appropriate application loaded thereon. In such circumstances, the user may elect to have the telephone or other controller device attempt to communicate with the new electronic device using a local area RF link, like RF link 44. The controller, for example controller 14, may be able to determine that a controller file associated with the new electronic device is available and that the controller may be able to retrieve and store in memory the controller file. In such an embodiment, controller 14, which at one point may not have been capable of communicating commands to an electronic device, may become controller capable. Receiving the file itself may involve over the air downloading of a Java application. The controller file or application received by controller 14 may reside in a memory local to the electronic device. For example, the file may reside in a memory associated with transceiver 30 of blimp 12. In such a circumstance, the controller file may be received across a local area RF link, like RF link 44.

In other embodiments, the controller file may be associated with a specific electronic device but reside at a network location remote from the electronic device. For example, the controller file may reside in a repository like repository 48, which may be accessible to controller 14. In such an embodiment, a user may input at controller 14 an identifier for blimp 12. The identifier may include, for example, a product brand and part number or any other effective identifier. In other embodiments, a new electronic device may communicate its identification information to controller 14 without user intervention. For example, controller 14 may include a Bluetooth module that sniffs for other Bluetooth-enabled devices. If it identifies blimp 12 as a Bluetooth-enabled device, controller 14 may engage in a process to "automatically" register with blimp 12, during which blimp 12 may communicate to controller 14 some identification information. During this process, blimp 12 may also be able to determine the types of applications that controller 14 is equipped to run. For example, blimp 12 may be locally storing Java applications, BREW applications, or others. Each of these applications may come in different forms—one better suited for a Palm OS and another better suited for a Symbian OS. If Blimp 12 determines which application/OS combination controller 14 prefers, blimp 12 may schedule and/or identify the correct application/OS for downloading to controller 14.

If the user, either actively or transparently, acquires identification information for the new electronic devices, the user may then use controller 14 or some other appropriate computing device to retrieve the controller file associated with the new electronic device.

For example, a user may employ controller 14 to retrieve an appropriate controller file from repository 48 by communicating through a series of communicative links. These links may include, for example, communication between controller 14 and cellular communication tower 50 across RF link 46, communication between cellular communication tower 50 with its associated computing device 52 and geographically disperse communication network 54 across link 56, and communication between network 54 and repository 48 across link 58. One skilled in the art will recognize that communication network 54 may include private and/or public networks, the Internet, other Internet Protocol (IP) networks, or some other network operable to interconnect remote nodes.

Though controller 14 and blimp 12 have been described in some detail, it should be clear that other features could be included in system 10. For example, blimp 12 or some other controlled device may include a speaker assembly (not shown), which may allow a user to supply a sound to controller 14 and have the sound projected from the speaker assembly. Blimp 12 may also include a processor or logic operable to determine signal strength of the signals received by transceiver 30 and to determine a direction from which the signals arrived. With this strength and direction information, blimp 12 may be able to determine that it is approaching the edge of controller 14's communication range and blimp 12 may also know the direction it needs to move to be closer to controller 14. In another embodiment, blimp 12 or some other controlled device may include a global positioning system (GPS) component. The GPS component may facilitate the above-described return to range feature. The GPS component may also be used to facilitate other features.

As mentioned above, controller 14 of system 10 may include a Java application. In some embodiments, the Java application may have been downloaded over the air and may be executing on controller 14's operating system (OS), which may be a Symbian OS, Pocket PC, Linux-based, a Palm OS, or other suitable computing device OS.

As an example of one potential application/OS combination, a developer may decide to develop a Java-based controller application for a Symbian OS-based computing device. The process of developing a Java application for the Symbian platform may include three main steps: (1) developing the Java code and supporting files, sound graphics, etc. which may, in some cases, be tested on an emulator; (2) creating the files to deploy the application to a Symbian interface so that it has a GUI icon and can be run from a native interface; and (3) packaging the application elements in a release file.

Development of a Symbian platform application in Java may look like the standard Java development path of creating the appropriate class files and packaging them into JARS. Preferably, Symbian classes are used. Once this has been done the application may be tested by running it in the emulator. Some versions of the Symbian platform may have a visual tool called AIF Builder that also includes an Icon Editor.

With AIF Builder, a developer may create: (1) an Application Information File which defines the application, its caption, and icon file; (2) a text file defining the application's additional class path; and (3) a Symbian proprietary multiple bit map format file for the application Icons. Once installed on an emulator, the application may be run. If an icon was developed, it may be displayed on the emulator. A single tap on the icon should launch the application. Other development tools may also be available. For example, CodeWarrior Wireless Studio is part of a comprehensive portfolio of wireless development tools from Metrowerks that includes support for Java Card technology, J2SE, J2ME and Personal Java Platforms. CodeWarrior may also work for Symbian OS and Palm OS.

Whatever the tool, a developer may want to have features such as code debuggers, code obfuscation and optimization. Developers may also want the tool to facilitate the targeting of a wide variety of platforms by supporting and adapting to multiple virtual machines (VMs) and software development kits (SDKs).

Developers may also want access to a Java-based relational database designed specifically for wireless Java and the ability to get guaranteed delivery (device-to-server, device-to-device, server-to-device) even when a network disconnect or shadow occurs. Message content with some tools can be Text, XML, SOAP, images, binary, Java objects, etc. Messages can be transmitted through standard wireless networks including GSM-Data, CDMA, CDPD, GPRS, UMTS, WLAN, SMS, WAP, Bluetooth, and other bearers.

Smart client applications may be written in Java and run on a wide range of devices. For a smart client application with Java on the client device, there may be two preferred options of Java platforms: Java 2 Standard Edition (J2SE) and Java 2 Micro Edition (J2ME). Applications based on J2SE are often standalone Java applications, usually using Personal Java. Personal Java is a subset of J2SE with a smaller Java Runtime Environment (JRE) suitable for the limited storage capacity of hand-held computing devices. Java Virtual Machines (JVMs) based on J2SE may be available for a wide variety of client devices including Pocket PC, Symbian OS, Linux and Palm OS devices.

In some embodiments, a controller file or application may be based on a smaller version of the java platform, like MIDP, that is often aimed at small footprint devices like cellular handsets. Java applications that run on MIDP devices are called MIDlets, and a MIDlet suite is a grouping of MIDlets that can share resources at runtime. A suite usually includes at least two separate files. The first may be a Java Application Descriptor (JAD), which may be a file that tells the Application Management Software (AMS), the piece of software on the hardware responsible for managing J2ME applications, how to handle the controller application. The JAD file may provide instructions for, among other things, installation, identification, and retrieval. The second may be a Java Archive (JAR), which may be a collection of the controller application's compiled byte classes, resources, and manifest files.

Occasionally and as mentioned above, a user may want to download the controller application Over The Air (OTA), which may be facilitated if the application's JAR and JAD files are available from a Web server-like environment. As such, users may be able to "HTTP" their way to the URL where the JAD file resides. In preferred embodiments, a controller device-side browser may download the controller application into the Applications folder and test it. This OTA procedure may take some time in a wide area environment experiencing reception difficulties.

In practice, a developer or electronic device manufacturer may place the JAR and JAD files in a place that is accessible. When accessing the repository, which may be remote or local, containing the controller JAR and JAD files with the controller computing device, a user may find that the JAD file is delivered to the phone as a text file. This may indicate that the repository is not properly configured. Specific MIME types may need to be associated with the "jar" and "jad" extensions so that the repository can tell the controller the kind of content to expect. In preferred embodiments, once the download process is complete, the controller MIDlet is deposited into the generic Applications directory and prompts the user to run the application.

As described above, there may be two files required for provisioning the controller application, the JAR and JAD. The JAD file may allow the developer to describe the controller application by specifying the minimum requirements for running the application, how many MIDlets are part of the suite, dependencies, etc. The JAD file may be used to provide information about the application without requiring the user to download the entire JAR. This may save the user some download time.

In many cases, the JAD file may be a simple text file with an attributes key, a colon, an optional space, and the value for that attribute. As described above, controller applications and other smart client applications may be written in some cases for devices with certain capabilities and some local storage capacity, such as personal digital assistants (PDAs), smartphones, and laptops.

In operation, a user may own an electronic device, like a television, and want to control the television or some feature associated therewith from the user's wireless telephone. If the television has an associated controller file or an application for allowing the wireless telephone to act as a remote control, the user may download the controller file to the user's phone. In preferred embodiments, the wireless telephone may have received the file and may be executing a controller application included in the file. The user may be presented with a GUI-based indication that the phone is in television controller mode, and the user may be allowed to control the television with the phone. In effect, a user may not need to worry about "losing the remote". To locate the remote, the user may simple need to download the controller to an appropriate computing device.

Though the above example describes a television, the controlled device may take several different forms. It may be a toy, like blimp 12, an automobile, or some other object having an electronic component capable of being remotely controlled. For example, some automobiles have electronic locks that may be unlocked remotely using a cellular service, like OnStar. With such a service, a user may find her self locked out of a car. The user makes a telephone call to a remote call center that sends an unlock signal to a cellular communication device embedded in the automobile.

A system incorporating teachings of the present disclosure may replace the two cellular calls and the need for an embedded cellular communication device with a peer-to-peer connection between the automobile (or some component of the automobile) and the user's cellular telephone (acting as a controller). In preferred embodiments, an unlock feature like the one described above or any other feature could include a password or authentication utility. The utility may include a simple user name/password log in or may be more complex and include additional levels of authentication like bio-identification such as speech, retinal or thumb print scans.

A technique incorporating teachings of the present disclosure may also be employed to make configuration of electronic devices transparent. A user may not want to remotely control a device, but the user may need the device to "register" with the user's local network. If the user buys a smart refrigerator capable of connecting to the Internet, the user may want the device to auto-configure with a local network gateway device, such as a wireless networking hub with broadband backhaul capability. The backhaul may be fixed wireless, cable, xDSL, etc. The user's phone or the network gateway device may find the new refrigerator, recognize that the refrigerator has an associated controller file to facilitate network registration, download the file, and use the file to transparently integrate the refrigerator into the local network.

A more detailed picture of a computing device that may be operable as a controller executing a controller application is shown in FIG. 2. As described above in the brief description of the figures, FIG. 2 depicts a cut away view of a cellular telephone 60 incorporating teachings of the present disclosure in order to act as a remote control for electronic devices. In the depicted embodiment, telephone 60 includes several integrated circuits on a circuit board, an antenna 62, and a liquid crystal display 64 presenting a composite image 67.

The components of telephone 60 could include any of several combinations of components. As depicted, telephone 60 includes a wide area wireless platform 66, which may be, for example, a GPRS module. As shown, platform 66 includes a wide area wireless transceiver 68, front end circuitry 70, and dual core processor 72. Front end circuitry 70 may help ensure that the baseband electronics will work well with transceiver 68. Dual core processor 72 may include, for example, a Digital Signal Processing (DSP) core as well as RISC or ARM capabilities. In some embodiments, the components of telephone 60 may use dedicated hardware and DSP firmware to help provide advanced functionality.

Platform 60 may be communicatively coupled to an application engine 74, which could be, for example, a Dragonball processor, and a power circuit 76, which may manage among other things a battery circuit 78. In some embodiments, battery circuit 78 may keep track of the power available from battery 80.

Application engine 74 may be communicatively coupled to several different components and may provide those components with additional processing capabilities. Example components may include a local area RF transceiver 82, which may be Bluetooth-enabled, Wi-Fi enabled, etc. Other components might be an image sensor 84, memory module 86, and peripheral controller 88, which may manage keypad, LCD, CODEC, IrDA, and other functionality. One skilled in the art will recognize that the many of the above described components could be combined or broken out into other combinations and that the memory could include onboard and added memory components including RAM, Flash, smart media, and others.

Although the present invention has been described in detail, it should be understood that various changes, substitutions and alterations to the devices, methods, and other aspects and techniques of the present invention can be made without departing from the spirit and scope of the invention as defined by the appended claims.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

receiving an over the air download of an application in a wireless telephone, the application including first instructions to control a remote controlled electronic device, the remote controlled electronic device including an image capturing device;

transmitting from the wireless telephone via a wide area cellular network an instruction to control the image capturing device, wherein the remote controlled electronic device is remote from the wireless telephone;

receiving at the wireless telephone first image data from the image capturing device;

transmitting from the wireless telephone another instruction to control a second remote controlled electronic device remote from the wireless telephone;

receiving at the wireless telephone second image data from the second remote controlled electronic device; and displaying a first image at the wireless telephone based on the first image data, displaying a second image at the wireless telephone based on the second image data simultaneously with displaying the first image, and storing saved image data representing the first image at the wireless telephone.

2. The method of claim 1, further comprising communicating identification information for the remote controlled electronic device to a network location to facilitate a search for the application.

3. The method of claim 1, further comprising controlling a movement of the image capturing device via a communication from the wireless telephone.

4. The method of claim 1, further comprising displaying the first image at a first display pane of the wireless telephone and displaying the second image at a second display pane of the wireless telephone, and indicating in a graphical user interface (GUI) which remote controlled electronic device is represented in at least one of the display panes.

5. The method of claim 1, further comprising communicating with the remote controlled electronic device prior to receiving the application.

6. The method of claim 1, wherein the instruction comprises a request to change a positioning of the image capturing device.

7. The method of claim 1, wherein the instruction comprises a request to change a zoom attribute of the image capturing device.

8. The method of claim 1, wherein the remote controlled electronic device is a part of a surveillance system.

9. The method of claim 1, further comprising communicating from the wireless telephone the saved image data as an attachment to an electronic mail message.

10. The method of claim 9, further comprising initiating communication of the saved image data via the wide area cellular network.

11. A surveillance system comprising:

a first image capturing device;

a second image capturing device;

a computer readable medium storing instructions configured to be executed by a processing system of a wireless telephone device located remote from the first and second image capturing devices such that the wireless telephone device is operable: (1) to simultaneously display a representation of a first image captured by the first image capturing device and a second image captured by the second image capturing device; and (2) to convert an input received via an input mechanism of the wireless telephone device into a command for at least one of the first and second image capturing devices; and a transceiver communicatively coupled to the first and second image capturing devices and configured to receive instructions from the wireless telephone device to control a characteristic of at least one of the first and second image capturing devices and to send image data from the first and second image capturing devices to the wireless telephone device.

12. The system of claim 11, wherein at least a portion of a communication between the surveillance system and the wireless telephone device is via a radio frequency (RF) link.

13. The system of claim 11, wherein the instructions are associated with identification information for the first image capturing device and stored such that a user can search for the instructions based at least partially on the identification information.

14. The system of claim 11, wherein the first image capturing device includes a digital zoom capability.

* * * * *